United States Patent
Wang et al.

(10) Patent No.: US 12,484,594 B2
(45) Date of Patent: Dec. 2, 2025

(54) METHOD FOR EXTENDING SHELF LIFE OF GERM REMAINED RICE BY MODERATE MOISTENING AND ELECTRON BEAM IRRADIATION

(71) Applicant: Jiangnan University, Wuxi (CN)

(72) Inventors: Ren Wang, Wuxi (CN); Yudan Jin, Wuxi (CN); Haibo Li, Wuxi (CN); Wei Feng, Wuxi (CN); Tao Wang, Wuxi (CN); Hao Zhang, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 554 days.

(21) Appl. No.: 17/953,303

(22) Filed: Sep. 26, 2022

(65) Prior Publication Data
US 2023/0263177 A1  Aug. 24, 2023

(30) Foreign Application Priority Data
Feb. 21, 2022  (CN) .................. 202210156065.X

(51) Int. Cl.
*A23B 9/06* (2006.01)
*A23L 5/00* (2016.01)

(52) U.S. Cl.
CPC . *A23B 9/06* (2013.01); *A23L 5/55* (2016.08)

(58) Field of Classification Search
None
See application file for complete search history.

(56) References Cited

U.S. PATENT DOCUMENTS 3,907,732 A * 9/1975 Maruyama ............... C08K 5/16
250/474.1

FOREIGN PATENT DOCUMENTS

| CN | 1457653 A | * | 11/2003 | |
| CN | 109380503 A | * | 2/2019 | ............... A23B 9/06 |

OTHER PUBLICATIONS

Translation of chen—2003.*
Translation of chen (Year: 2003).*
Pan et al., "Electron beam irradiation as a tool for rice grain storage"—International Journal for Biological Macromolecules—164 (2020) 2915 to 2921. (Year: 2020).*

* cited by examiner

*Primary Examiner* — Jyoti Chawla
(74) *Attorney, Agent, or Firm* — MATTHIAS SCHOLL P.C.; Matthias Scholl

(57) ABSTRACT

A method for extending shelf life of germ remained rice includes evenly spreading the germ remained rice on a sheet tray, and moderately moistening the germ remained rice, packing the germ remained rice moistened, and irradiating the germ remained rice with an electron beam.

6 Claims, No Drawings

METHOD FOR EXTENDING SHELF LIFE OF GERM REMAINED RICE BY MODERATE MOISTENING AND ELECTRON BEAM IRRADIATION

CROSS-REFERENCE TO RELATED APPLICATIONS

Pursuant to 35 U.S.C. § 119 and the Paris Convention Treaty, this application claims foreign priority to Chinese Patent Application No. 202210156065.X filed Feb. 21, 2022, the contents of which, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, MA 02142.

BACKGROUND

The disclosure relates to the field of food storage, and more particularly, to a method for extending shelf life of germ remained rice by moderate moistening and electron beam irradiation on the germ remained rice.

Germ remained rice is a kind of rice that includes more than 80% of its germ after being processed. The germ accounts for 3% by weight of rice grain and is rich in protein, fat, vitamins, and minerals. The germ further contains glutathione, a chemical that participates in antioxidant response and transport of amino acids across cell membranes. High levels of fat and biological enzyme activity cause the germ to deteriorate and become rancid. At present, low temperature storage, modified atmosphere packaging, vacuum packing, and microwave technology are widely used for production and extending shelf life of high-quality germ remained rice. The modified atmosphere packaging, also known as inflatable packaging, is a technology that uses gases such as $CO_2$ or $N_2$ for packing. Inflatable packaging products or vacuum packed products may have a short shelf life because they suffer wear and tear during handling and transport. The microwave technology extends the shelf life of the germ remained rice while increasing the fissure rate and broken rate of the germ remained rice and decreasing palatability.

SUMMARY

The first objective of the disclosure is to provide a method for extending shelf life of germ remained rice by moderate moistening and electron beam irradiation on the germ remained rice, so as to maintain the appearance, edible quality, and palatability of the germ remained rice.

The method comprises:
(1) evenly spreading the germ remained rice on a sheet tray; and moderately moistening the germ remained rice; and
(2) packing the moistened germ remained rice; and irradiating the packed germ remained rice with an electron beam.

In a class of this embodiment, in 1), the germ remained rice has a germ retention rate of more than or equal to 80%.

In a class of this embodiment, in 1), the germ remained rice is evenly spread on the sheet tray to a thickness of equal to or less than 2 cm.

In a class of this embodiment, in 1), the term "moderately moistening" as used herein refers to a process comprising transferring the sheet tray to a constant climate chamber without spraying water until moisture seeps through the germ remained rice.

In a class of this embodiment, in 1), the germ remained rice is moistened at a temperature of 20° C.-30° C. with a relative humidity of 88-99% for 1.0-2.0 hours.

In a class of this embodiment, in 1), the germ-remained rice is germ-remained indica rice or germ-remained *japonica* rice; the germ-remained indica rice is moistened to a moisture content of not more than 14.5%, and the germ-remained *japonica* rice is moistened to a moisture content of not more than 15.5%.

In a class of this embodiment, in 2), the term "packing" as used herein refers to sealing the moistened germ remained rice in a bag without removing the air; and the germ remained rice is evenly spread in the bag to a thickness of equal to or not more than 1 cm.

In a class of this embodiment, the bag comprises nylon composite.

In a class of this embodiment, in 2), the germ remained rice is irradiated with the electron beam at 0.5-1.0 kGy.

The second objective of the disclosure is to provide the germ remained rice treated by the method.

The following advantages are associated with the method and the germ remained rice of the disclosure.

1. The electron beam irradiation is an emerging technology that uses a high-energy electron beam to irradiate an object for a variety of purposes. The energy is transferred to the object, causing ionization of the object and generating free radicals H· or OH·. The two free radicals change the chemical structures of biological substances in microorganisms and living biological cells, thus damaging biomolecules and killing pests. The free radicals further damage proteins and fats, which leads to physical and chemical reactions in the object, decreasing enzyme activity and prolonging the shelf life of the germ remained rice. In comparison to conventional Gamma-ray irradiation, an electron beam facility is safer, easier to operate, more environment friendly, and leaves no chemical residues in the object being irradiated.
2. The method increases the moisture content of the germ remained rice, so that lipase activity is decreased by the electron beam irradiation, delaying an increase in value of fatty acid during the storage process of the germ remained rice, thus prolonging the shelf life of germ remained rice.
3. The moistening process decreases the fissure rate of the germ remained rice irradiated with the electron beam and maintains moisture in the germ remained rice during storage, so as to improve the appearance quality and palatability of the germ remained rice. The moderate moistening process of the disclosure is superior to directly spraying water on the germ remained rice in a conventional way, because directly spraying water on the germ remained rice results in dramatic increase in the fissure rate and broken rate of the germ remained rice.
4. In comparison to spaying of water on the germ remained rice, the constant climate chamber allows the moisture to seep slowly through the germ remained rice, reducing cracks in the germ remained rice and facilitating control of the moisture content of the germ remained rice.

DETAILED DESCRIPTION OF THE EMBODIMENTS

Example 1

A method for extending shelf life of germ remained rice by moderate moistening and electron beam irradiation on the germ remained rice, and the method comprises:
1. germ remained rice (Nanjing 9108) was evenly spread on a sheet tray to a thickness of equal to or less than 2 cm, transferred to a constant climate chamber, and moistened at a temperature of 30° C. and a relative humidity of 99% for 2 hours, to achieve a moisture content of equal to or more than 15.5%; and
2. the moistened germ remained rice was sealed in a nylon composite bag, evenly spread to a thickness of equal to or less than 1 cm, irradiated with an electron beam at a dose of 1.0 kGy, and stored at 25° C.

Example 2

A method for extending shelf life of germ remained rice by moderate moistening and electron beam irradiation on the germ remained rice, and the method comprises:
1. germ remained rice (Nanjing 9108) was evenly spread on a sheet tray to a thickness of equal to or less than 2 cm, transferred to a constant climate chamber, and moistened at a temperature of 25° C. and a relative humidity of 88% for 1 hour, to achieve a moisture content of equal to or more than 15.5%; and
2. the moistened germ remained rice was sealed in a nylon composite bag, evenly spread to a thickness of equal to or less than 1 cm, irradiated with an electron beam at a dose of 1.0 kGy, and stored at 25° C.

Example 3

A method for extending shelf life of germ remained rice by moderate moistening and electron beam irradiation, and the method comprises:
1. germ remained rice (Nanjing 9108) was evenly spread on a sheet tray to a thickness of equal to or less than 2 cm, transferred to a constant climate chamber, and moistened at a temperature of 20° C. and a relative humidity of 95% for 1.5 hours, to achieve a moisture content of equal to or more than 15.5%; and
2. the moistened germ remained rice was sealed in a nylon composite bag, evenly spread to a thickness of equal to or less than 1 cm, irradiated with the electron beam at a dose of 0.5 kGy, and stored at 25° C.

Comparison Example 1

A method for extending the shelf life of the germ remained rice, and the method comprises:
1. germ remained rice (Nanjing 9108) was sealed in a nylon composite bag, and evenly spread to a thickness of equal to or less than 1 cm; and
2. the sealed germ remained rice was then stored at 25° C.

Comparison Example 2

A method for extending the shelf life of the germ remained rice by electron beam irradiation, and the method comprises:
1. germ remained rice (Nanjing 9108) was sealed in a nylon composite bag, and evenly spread to a thickness of equal to or less than 1 cm; and
2. the sealed germ remained rice was irradiated with an electron beam at a dose of 1.0 kGy and stored at 25° C.

Comparison Example 3

A method for extending the shelf life of germ remained rice by electron beam irradiation, and the method comprises:
1. germ remained rice (Nanjing 9108) was sealed in a nylon composite bag, and evenly spread to a thickness of equal to or less than 1 cm; and
2. the sealed germ remained rice was irradiated with an electron beam at a dose of 2.0 kGy and stored at 25° C.

Example 4

1. Physicochemical Properties of Germ Remained Rice

A physicochemical test was performed on the germ remained rice (before storage) obtained from Examples 1-3 and Comparison examples 1-3; and results were shown in Table 1. Broken rate of the germ remained rice was calculated in accordance with the method given in GB/T 5503-2009; fissure rate of the germ remained rice was calculated in accordance with the method given in GB/T 5496-1985; and the lipase activity was calculated in accordance with the method given in GB/T 5523-2008. A half-germ method was used to calculate the germ retention rate of the germ remained rice and was as follows: the germ remained rice was transferred to a white enamel plate and observed to determine the germ retention rate. Rice grains were morphologically categorized as full germ, flat germ, half germ, residual germ and empty germ. Germ remained rice grains referred to rice grains with full germ, flat germ and half germ. The germ retention rate was expressed as a percentage of the mass of the germ remained rice grains in relation to the total mass of the rice grains.

TABLE 1

| Group | Germ retention rate (%) | Fissure rate (%) | Broken rate (%) | Relative lipase activity (%) |
|---|---|---|---|---|
| Example 1 | 82.4 ± 0.1 | 42.61 ± 0.76 | 5.81 ± 0.12 | 59.8 ± 1.17 |
| Example 2 | 82.4 ± 0.3 | 45.33 ± 0.18 | 6.22 ± 0.10 | 61.2 ± 0.87 |
| Example 3 | 82.5 ± 0.5 | 36.90 ± 0.52 | 4.95 ± 0.05 | 66.5 ± 1.25 |
| Comparison example 1 | 82.5 ± 1.0 | 32.70 ± 0.23 | 4.50 ± 0.11 | 100 ± 0.00 |
| Comparison example 2 | 82.0 ± 0.1 | 49.20 ± 0.61 | 6.60 ± 0.09 | 68.7 ± 0.56 |
| Comparison example 3 | 81.5 ± 0.3 | 66.20 ± 0.32 | 15.44 ± 0.12 | 48.7 ± 1.28 |

As shown in Table 1, the germ retention rate remained unchanged after electron beam irradiation. The moderate moistening process reduced the formation of fissures caused by electron beam irradiation so as to prevent deformation of the germ remained rice. The enzyme activity of the moistened germ remained rice was decreased more efficiently than that of dry germ remained rice. In Comparison example 3, the germ remained rice was irradiated with electron beam at a dose of 2.0 kGy to achieve the desired effect of inactivating the enzyme; the broken rate increased to 15.44% and the fissure rate increased to 66.20%, reducing the appearance quality of the germ remained rice.

2. Moisture Content of Germ Remained Rice

The moisture content of the germ remained rice obtained from Examples 1-3 and Comparison examples 1-2 was calculated in accordance with the rules given in GB/5009.3-2016. The results were shown in Table 2.

TABLE 2

| Group | Moisture content (%) | | | | |
|---|---|---|---|---|---|
| | 0 d | 30 d | 60 d | 90 d | 120 d |
| Example 1 | 15.32 ± 0.01 | 15.21 ± 0.12 | 14.85 ± 0.4 | 14.19 ± 0.52 | 13.65 ± 0.22 |
| Example 2 | 14.76 ± 0.08 | 14.65 ± 0.3 | 14.26 ± 0.01 | 13.53 ± 0.18 | 12.95 ± 0.17 |
| Example 3 | 14.93 ± 0.31 | 14.77 ± 0.11 | 14.42 ± 0.24 | 13.83 ± 0.24 | 13.31 ± 0.18 |
| Comparison example 1 | 12.93 ± 0.06 | 12.70 ± 0.02 | 12.34 ± 0.01 | 11.95 ± 0.03 | 11.76 ± 0.41 |
| Comparison example 2 | 12.87 ± 0.11 | 12.80 ± 0.18 | 12.31 ± 0.18 | 11.45 ± 0.40 | 11.33 ± 0.35 |

As shown in Table 2, the germ remained rice obtained from Examples 1-3 had higher moisture content than that of Comparison example 1. The moistening process maintains moisture in the germ remained rice during storage to improve the quality of the germ remained rice.

3. Fatty Acid Value and Palatability of Germ Remained Rice

The germ remained rice obtained from Examples 1-3 and Comparison examples 1-2 were stored for a period of time and measured to determine the fatty acid value (mg KOH/100 g) and palatability; and the results were shown in Tables 3 and 4. The fatty acid value was calculated in accordance with the method given in GB/T 15684-2015; and the palatability was determined by a rice taste meter (STA1B, SATAKE Company). 30.0 g of the germ remained rice was added to a stainless steel pot and washed with a continuous stream of running water for 30 seconds. The outside of the stainless steel pot was cleaned. The cleaned germ remained rice was mixed with 1.4 times its weight of clean water (42.0 g) and allowed to soak for 30 minutes. A filter paper was covered on the stainless steel pot and fastened with an elastic band; the stainless steel pot was placed in a steamer, cooked for 30 minutes, and kept warm for 10 min. The cooked germ remained rice in the stainless steel pot was stirred until light and fluffy, covered with the filter paper, placed in a cooling box, and cooled with a fan for 20 minutes; the germ remained rice was then covered with a stainless steel cover, allowed to stand for 100 minutes, and used in subsequent experiments. 8.0 g of the cooked germ remained rice (e.g. 8.0 g of germ-remained *japonica* rice or 7.0 g of germ-remained indica rice) was placed in a space surrounded by a stainless steel ring with a diameter of 3.0 cm and a height of 0.9 cm. A tablet press was used to press both the front and back sides of the stainless steel pot, each side for 10 seconds; and the pressed rice was measured by the rice taste meter.

TABLE 3

| Group | Example 1 | Example 2 | Example 3 | Comparison example 1 | Comparison example 2 |
|---|---|---|---|---|---|
| 0 d | 14.5 ± 1.0 | 14.5 ± 0.5 | 14.5 ± 0.6 | 14.4 ± 0.8 | 14.5 ± 0.2 |
| 15 d | 16.2 ± 1.3 | 16.8 ± 0.5 | 17.9 ± 0.2 | 18.8 ± 1.0 | 18.6 ± 0.8 |
| 30 d | 17.2 ± 0.5 | 18.3 ± 0.3 | 19.1 ± 0.4 | 35.4 ± 1.2 | 19.9 ± 0.8 |
| 45 d | 20.9 ± 0.7 | 21.5 ± 0.5 | 22.5 ± 1.0 | 41.5 ± 0.1 | 23.7 ± 0.6 |
| 60 d | 23.2 ± 0.4 | 24.3 ± 0.3 | 25.3 ± 0.5 | 57.8 ± 1.3 | 27.3 ± 0.8 |
| 75 d | 27.8 ± 1.2 | 28.6 ± 0.4 | 29.1 ± 0.7 | 68.5 ± 1.0 | 32.5 ± 0.0 |
| 90 d | 30.5 ± 0.9 | 31.5 ± 0.3 | 32.2 ± 0.3 | 85.3 ± 0.3 | 36.2 ± 0.8 |
| 105 d | 33.5 ± 1.1 | 34.4 ± 0.2 | 37.5 ± 0.4 | 98.3 ± 0.5 | 42.7 ± 1.5 |
| 120 d | 40.1 ± 0.8 | 42.9 ± 0.1 | 43.4 ± 0.2 | 113.5 ± 0.8 | 50.6 ± 0.8 |

TABLE 4

| Group | 0 d | | | 120 d | | |
|---|---|---|---|---|---|---|
| | Appearance | Palatability | Overall rating | Appearance | Palatability | Overall rating |
| Example 1 | 6.1 | 6.7 | 74.8 | 5.4 | 6.5 | 73.4 |
| Example 2 | 5.9 | 6.5 | 73.6 | 5.7 | 6.2 | 72.6 |
| Example 3 | 6.4 | 6.8 | 75.2 | 5.9 | 6.6 | 73.8 |
| Comparison example 1 | 6.8 | 7.1 | 77.7 | 5.8 | 5.9 | 70.4 |
| Comparison example 2 | 5.3 | 6.0 | 70.2 | 4.9 | 5.5 | 68.0 |

As shown in Tables 3-4, in Comparison example 1, the fatty acid value increased to 35.4±1.2 mg KOH/100 g after the germ remained rice was stored for 30 days; according to the guidelines for evaluation of paddy storage character (GB/T 20569-2006), the germ remained rice with the fatty acid value exceeding 35 mg KOH/100 g was considered as aged or expired rice, so the shelf life of the germ remained rice in Comparison example 1 was 15 days. In Comparison example 2 and Examples 1-3, the germ remained rice had a shelf life of 75 days, 105 days, 105 days, and 90 days, respectively. The results showed that the moderate moistening process and the electron beam irradiation contributed to an extension of the shelf life of the germ remained rice. After being stored for 0 day, the germ remained rice in Examples 1, 2, and 3 were less palatable than that of Comparison example 1 but more palatable than that of Comparison example 2; the results showed that the moderate moistening process prevented palatability deterioration of the germ remained rice caused by the electron beam irradiation. After storage for 120 days, the germ remained rice in Examples 1, 2, and 3 were more palatable than that of both Comparison examples 1 and 2; the results demonstrated that the moderate moistening process and the electron beam irradiation prevented palatability deterioration of the germ remained rice.

The moderate moistening process of the disclosure was preferable to spraying of water on the germ remained rice, because the latter resulted in dramatic increases in the fissure rate and broken rate of the germ remained rice.

The method of the disclosure moistens the germ remained rice and irradiates it with an electron beam to maintain the appearance quality and palatability of a grain of germ remained rice, thereby extending its shelf life.

It will be obvious to those skilled in the art that changes and modifications may be made, and therefore, the aim in the appended claims is to cover all such changes and modifications.

What is claimed is:

1. A method for extending shelf life of germ-remained rice, the method comprising:
   1) evenly spreading the germ-remained rice on a sheet tray, and moderately moistening the germ-remained rice; and
   2) packing the germ-remained moistened rice, and irradiating the germ-remained rice with an electron beam; and wherein moderately moistening comprises transferring the sheet tray to a constant climate chamber, and moistening the germ-remained rice at a temperature of 20-30° C. and a relative humidity of 88-99% for 1.0-2.0 hours without spraying water, until moisture seeps through the germ-remained rice; and the germ-remained rice is germ-remained indica rice or germ-remained *japonica* rice;

the germ-remained indica rice is moistened to a moisture content of not more than 14.5%, and the germ-remained *japonica* rice is moistened to a moisture content of not more than 15.5%; and wherein the germ-remained rice moistened is irradiated with an electron beam at a dose of 0.5 to 1.0 kGy and stored at 25° C. from 75-120 days.

2. The method of claim 1, wherein in 1), the germ-remained rice has a germ retention rate of more than or equal to 80%.

3. The method of claim 1, wherein in 1), the germ-remained rice is evenly spread on the sheet tray to a thickness of equal to or less than 2 cm.

4. The method of claim 1, wherein in 2), packing comprises sealing the moistened germ-remained rice in a bag without removing the air; and the germ-remained rice is evenly spread in the bag to a thickness of not more than 1 cm.

5. The method of claim 4, wherein the bag comprises nylon composite.

6. Germ-remained rice treated by the method of claim 1.

* * * * *